United States Patent
Rompen et al.

(10) Patent No.: US 9,494,212 B2
(45) Date of Patent: Nov. 15, 2016

(54) TRANSVERSE SEGMENT FOR A DRIVE BELT WITH A CARRIER RING AND MULTIPLE TRANSVERSE SEGMENTS

(71) Applicant: ROBERT BOSCH GMBH, Stuttgart (DE)

(72) Inventors: Guillaume Gerard Hubertus Rompen, Munstergeleen (NL); Pascal Henricus Johannus Rinket, Tilburg (NL)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/655,924

(22) PCT Filed: Dec. 29, 2013

(86) PCT No.: PCT/EP2013/078096
§ 371 (c)(1),
(2) Date: Jun. 26, 2015

(87) PCT Pub. No.: WO2014/102357
PCT Pub. Date: Jul. 3, 2014

(65) Prior Publication Data
US 2015/0337922 A1 Nov. 26, 2015

(30) Foreign Application Priority Data
Dec. 28, 2012 (NL) ..................................... 1039980

(51) Int. Cl.
*F16G 1/21* (2006.01)
*F16G 1/22* (2006.01)
*F16G 5/16* (2006.01)

(52) U.S. Cl.
CPC ..................................... *F16G 5/16* (2013.01)

(58) Field of Classification Search
CPC .......... F16G 5/16; F16G 5/163; C22C 38/001; C22C 38/08; C22C 38/12
(Continued)

(56) References Cited

U.S. PATENT DOCUMENTS 4,526,559 A * 7/1985 Smirl ........................ F16G 5/16
474/201
4,610,648 A * 9/1986 Miranti, Jr. ............... F16G 5/16
474/242
(Continued)

FOREIGN PATENT DOCUMENTS

JP 60-26350 2/1985
JP 61-160344 10/1986
JP 2003-269547 9/2003

OTHER PUBLICATIONS

International Search Report and Written Opinion of the International Searching Authority PCT/EP2013/078096 dated Apr. 22, 2014.

*Primary Examiner* — Henry Liu
(74) *Attorney, Agent, or Firm* — Young & Thompson

(57) ABSTRACT

Transverse segment (32) for a drive belt (3) for a continuous variable transmission provided with two cut-outs (33) that are each bounded in one direction by a radially outwardly facing saddle surface (42) of the transverse segment (32), which saddle surface (42) is convexly curved according to a local radius of curvature that, at least on average, is smaller on a first axial side of the saddle surface (42) relative to a geometric midpoint (MP) thereof, as compared to an average local radius of curvature of the respectively opposite axial side of the saddle surface (42).

4 Claims, 2 Drawing Sheets

Figure 1:
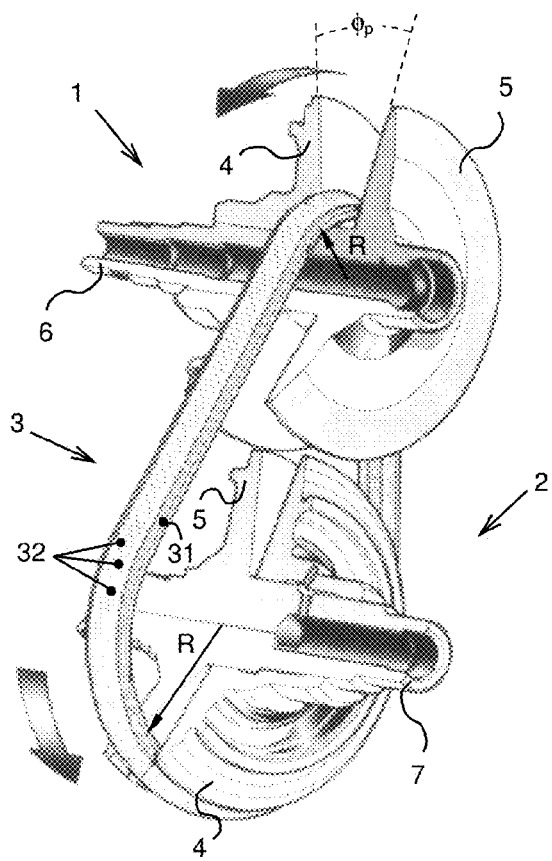

(58) Field of Classification Search
USPC .................................. 474/242, 244, 272
See application file for complete search history.

(56) References Cited

U.S. PATENT DOCUMENTS

| | | | | |
|---|---|---|---|---|
| 4,619,634 A * | 10/1986 | Nakawaki | ................. | F16G 5/16 474/201 |
| 4,676,768 A * | 6/1987 | Miranti, Jr. | ............... | F16G 5/16 474/201 |
| 4,826,473 A * | 5/1989 | Miyawaki | ................. | F16G 5/16 474/240 |
| 5,123,879 A * | 6/1992 | Lecouturier | ............. | F16G 5/16 474/242 |
| 6,090,004 A * | 7/2000 | Kanehara | ................. | F16G 5/16 474/201 |
| 6,110,065 A * | 8/2000 | Yagasaki | ................ | F16G 5/16 474/244 |
| 6,238,313 B1 * | 5/2001 | Smeets | .................... | F16G 5/16 474/201 |
| 6,332,854 B1 * | 12/2001 | Kanokogi | ................ | F16G 5/16 474/201 |
| 6,464,606 B2 * | 10/2002 | Brandsma | ................ | F16G 5/16 474/237 |
| 6,612,954 B2 * | 9/2003 | Akagi | ....................... | F16G 5/16 474/237 |
| 6,705,963 B2 * | 3/2004 | Smeets | .................. | F16G 5/163 474/201 |
| 6,830,525 B1 * | 12/2004 | Brandsma | ............... | F16G 5/163 474/201 |
| 6,832,967 B2 * | 12/2004 | Kanokogi | ................ | F16G 5/16 474/201 |
| 7,294,077 B2 * | 11/2007 | Wang | ........................ | F16G 5/16 156/137 |
| 7,963,873 B2 * | 6/2011 | Kobayashi | ................ | F16G 5/16 474/201 |
| 8,047,939 B2 * | 11/2011 | Van Der Meer | .......... | F16G 5/16 474/242 |
| 8,100,798 B2 * | 1/2012 | Nishimi | .................... | F16G 5/16 474/242 |
| 8,104,159 B2 * | 1/2012 | Hattori | ...................... | F16G 5/16 29/407.01 |
| 8,870,695 B2 * | 10/2014 | Nishimi | .................... | F16G 5/16 474/242 |
| 2001/0004616 A1 * | 6/2001 | Brandsma | ................. | F16G 5/16 474/242 |
| 2002/0032090 A1 * | 3/2002 | Van Lith | .................... | F16G 5/16 474/242 |
| 2002/0132691 A1 * | 9/2002 | Pennings | ............. | C22C 38/001 474/242 |
| 2003/0004024 A1 * | 1/2003 | Van Dijnsen | ............ | F16G 5/16 474/242 |
| 2005/0144899 A1 * | 7/2005 | Tran | ......................... | F16G 5/16 52/749.1 |
| 2005/0187056 A1 * | 8/2005 | Wang | ........................ | F16G 5/16 474/242 |
| 2007/0072721 A1 * | 3/2007 | Takagi | ...................... | F16G 5/16 474/242 |

\* cited by examiner

TRANSVERSE SEGMENT FOR A DRIVE BELT WITH A CARRIER RING AND MULTIPLE TRANSVERSE SEGMENTS

The present disclosure relates to a transverse segment for a drive belt for a continuously variable transmission for motor vehicles, as defined in the preamble of the claim 1 hereinafter.

Such a transverse segment and the drive belt incorporating it are well-known and are, for instance, described in the European patent applications EP-A-0 626 526 and EP-A-1 566 567. The known drive belt is composed of a plurality of steel transverse segments and two endless, i.e. ring-shaped carriers, each extending through a recess provided on either lateral side of the segments such that these segments are supported and guided by the carrier ring. Typically the carrier rings are also made of steel and are each composed of a number of individual continuous bands that are narrowly fitted, one around the other. The transverse segments are neither fixed to one another nor to the carrier rings, such that they can move relative to the carrier rings at least along the circumference, i.e. the length thereof. In the drive belt, adjacent transverse segments abut one another through their respective front and back main surfaces, which main surfaces face, at least predominantly, in the said circumferential direction. The known drive belt is operated in a lubricated or oiled environment, both to reduce belt-internal friction losses and to cool the belt and the pulleys of the transmission.

The known transverse segment is provided with a friction surface on either lateral, i.e. axial side thereof. By means of these friction surfaces the transverse segment arrives in (frictional) contact with a driving pulley and a driven pulley of the transmission such that a rotation of the driving pulley can be transferred to the driven pulley via the likewise rotating drive belt. The known transverse segment is further provided with a stud on its front main surface and a hole on its back main surface. In the drive belt the stud of a first transverse segment is inserted in the hole of a second, adjacent transverse segment. As a result, the consecutive transverse segments in the drive belt mutually align each other in a plane that is oriented parallel with the said main surfaces thereof, i.e. perpendicular to the said circumferential direction.

During operation of the drive belt, a relative movement may exist between the transverse segments and the carrier rings the said circumferential direction thereof. Furthermore, the transverse segments that are urged radially outwards by the pulleys during operation are contained in that direction by the carrier rings. Thus a transverse segment arrives into contact with the carrier rings via the radial inner surfaces of the recesses thereof that contain the carrier rings. These latter surfaces are referred to in the art as the saddle surfaces of the transverse segments.

A width-wise shape or contour of the saddle surfaces is known to be shaped slightly convex to promote the preferred alignment of a respective carrier ring relative to (the axial width of) a respective saddle surface. In this latter respect it is known that the carrier ring tends to centre itself on the highest, i.e. most radially outward point of the saddle surface during operation. This highest point of the saddle surface does not necessarily lie in the middle thereof. In some specific transmission designs it may be considered more favourable to minimise a contact between the carrier ring and the transverse segments in the axial direction, in which case said highest point is located more towards the lateral side of the transverse segment, an example whereof is provided by EP-A-1 566 567. However, the opposite design, wherein a contact between the axial side of the carrier ring and the pulleys is preferred to be avoided and wherein the highest point of the width-wise contour of the saddle surface is offset relative to the said middle thereof and away from the lateral side of the transverse segment, is also suggested in the art.

In general, a net force associated with the above-described tendency of the carrier ring to centre itself on the highest point of the saddle surface, i.e. the axial alignment force, is zero when the carrier ring is centred on highest point of the saddle surface and increases in dependency on a displacement of the carrier ring in the axial direction relative to such highest point. In practice such axial displacement of the carrier ring is limited to half a clearance or play that is provided between the carrier ring and the transverse segments in the axial direction. As a result, also the said axial alignment force is limited in practice, such that an unfavourable friction, possibly even abrasive contact between an axial side of the carrier ring and the transverse segments, the pulleys, or both can easily occur, which unfavourable contact can, at least in the long run, result in undesirable wear. Therefore, it is presently aimed to improve the effectiveness of the (self-)alignment of the carrier ring relative to the saddle surface, in particular by increasing the dependency of the axial alignment force on the displacement of the carrier ring.

According to an insight underlying the present disclosure, such object is realised by providing the saddle surface with a convex curvature that is different towards either axial side thereof. In particular, a radius or (an average of a plurality of) radii of curvature of the axial contour of the saddle surface is/are different between such axial sides. This design measure relies on the technical insight that the more convexly curved the saddle surface is, i.e. the smaller the radius or radii of curvature of the saddle surface is/are, the more effective the (self-)alignment of the carrier ring relative to the saddle surface will be. In other words: a force component of the axial alignment force acting on the carrier ring in the axial side during operation increases, as the local radius of curvature of the saddle surface decreases.

Since, in accordance with the present disclosure, a different radius of curvature is applied on either axial side of the saddle surface, the carrier ring will experience a net (alignment) force, also when it is aligned with the axial centre of the saddle surface. Instead, the carrier ring will be aligned more towards the side of the saddle surface provided with the larger radius (or radii) of curvature. In this latter position, the force components of the axial alignment force experienced by the carrier ring will be mutually balanced, because a smaller portion of the width of the carrier ring receives a high(-er) axial alignment force (component) on the side of the saddle surface with the smaller radius of curvature, whereas a larger portion of the width of the carrier ring receives a low(-er) axial alignment force on the side of the saddle surface with the larger radius of curvature.

In summary, by decreasing the radius of curvature of the saddle surface on one axial side thereof and relative to the radius of curvature on the other axial side of the saddle surface, the (self-) alignment of the carrier ring relative to such saddle surface is biased towards the said other axial side of the saddle surface. Thus, the known design measure for realising such biasing, namely to axial offset the highest point of the saddle surface relative to a geometric midpoint thereof, can be replaced by the design measure according to the present disclosure. It is also possible to apply both these design measures simultaneously.

Figure 2:
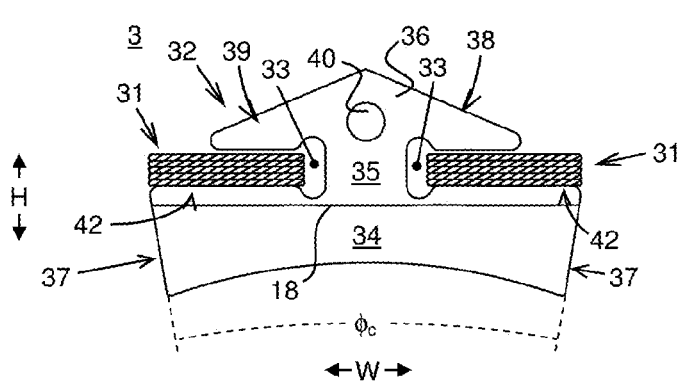
Figure 3:
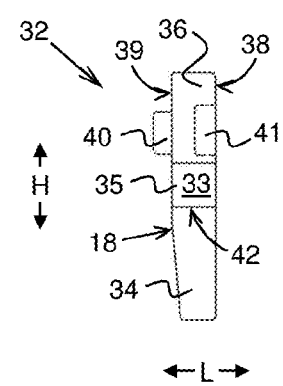
Figure 4:
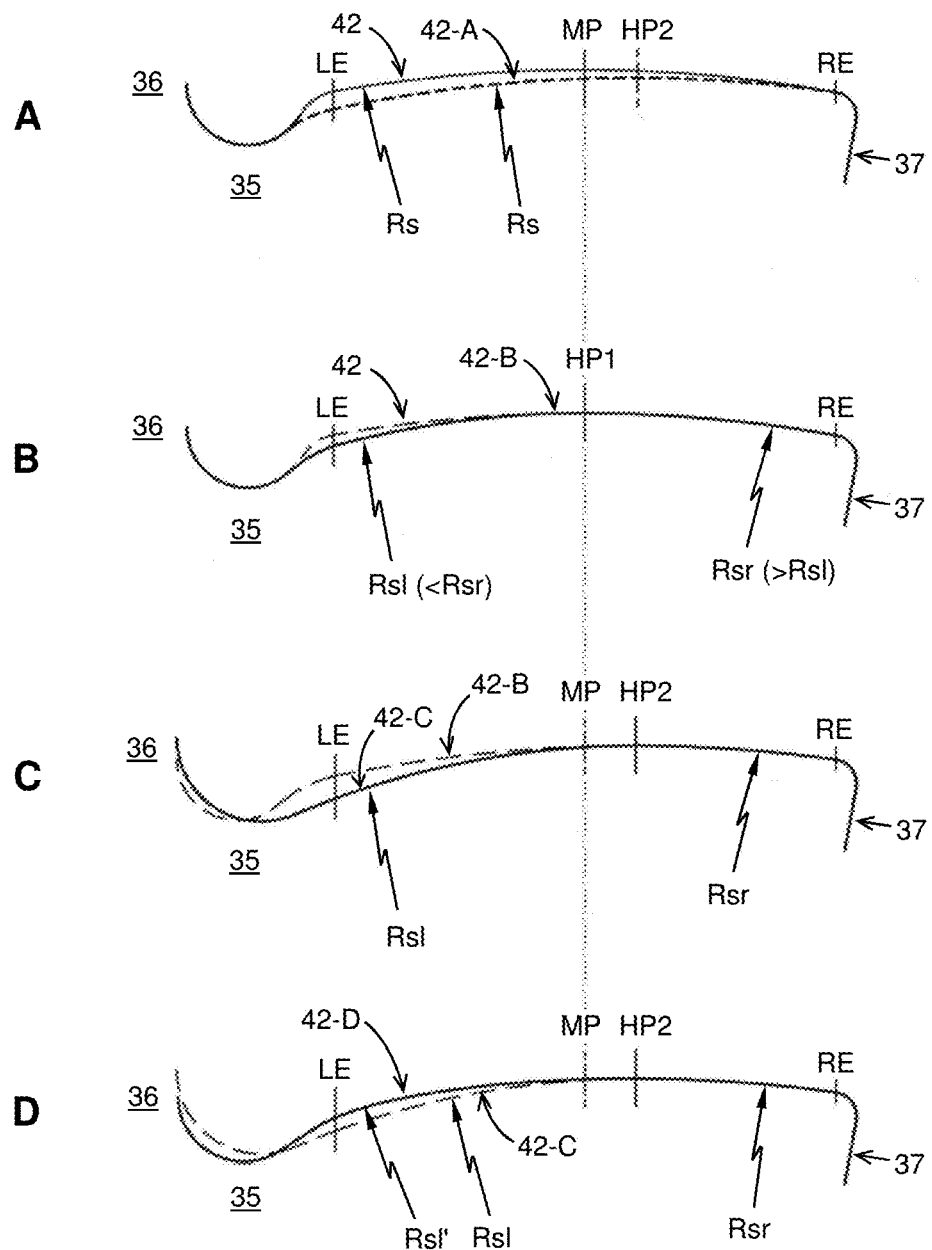

The novel transverse segment will now be elucidated further with reference to the attached drawing figures, whereof:

FIG. 1 provides a schematic perspective view of the continuously variable transmission with a drive belt running over two pulleys, which drive belt includes an endless carrier and a number of transverse segments;

FIG. 2 shows a cross section of the known drive belt, which cross-section is oriented in the circumference direction of the belt;

FIG. 3 provides a width-wise oriented view of a transverse segment of the known drive belt;

FIG. 4A provides a close-up of a detail of the known transverse segment, schematically illustrating a convexly curved saddle surface thereof;

FIG. 4B is a schematic representation of the saddle surface contour similar to

FIG. 4A, however, depicting a first embodiment of the saddle surface shaped in accordance with the present disclosure;

FIG. 4C is a schematic representation of the saddle surface contour similar to

FIGS. 4A and 4B, however, depicting a second embodiment of the saddle surface shaped in accordance with the present disclosure; and FIG. 4D is a schematic representation of the saddle surface contour similar to FIGS. 4A-4C, however, depicting a third embodiment of the saddle surface shaped in accordance with the present disclosure.

In the drawing figures equal reference signs indicate equal or similar structures and/or parts.

The schematic view of a continuously variable transmission in FIG. 1 shows a drive belt 3 that runs over two pulleys 1, 2 and that includes a flexible endless carrier or carrier ring 31 and an essentially contiguous row of transverse segments 32 that are mounted on and arranged along the circumference of the carrier ring 31. In the illustrated configuration of the transmission, the upper pulley 1 will rotate more quickly than the lower pulley 2. By changing the distance between the two conical sheaves 4, 5 of the pulleys 1, 2, the so-called running radius R of the drive belt 3 on each pulley 1, 2 can be changed in a mutually coordinated manner and, as a result, the (transmission) ratio between the rotational speeds of the two pulleys 1, 2 can be varied.

In FIG. 2, the drive belt 3 is shown in a cross section thereof facing in the circumference or length direction L (FIG. 3) of the belt 3, i.e. facing in a direction perpendicular to the axial or width direction W and the radial or height direction H thereof. This FIG. 2 shows the presence of two carrier rings 31, shown in cross-section, that carry and guide the transverse segments 32 of the drive belt 3, whereof one transverse segment 32 is shown in front elevation.

The transverse segments 32 and the carrier rings 31 of the drive belt 3 are typically made of metal, usually a steel alloy. The transverse segments 32 take-up a clamping force exerted between the sheaves 4, 5 of each pulley 1, 2 via contact faces 37 thereof, one such contact face 37 being provided at either axial side of the transverse segment 32. These contact faces 37 are mutually diverging in radial outward direction such that an acute angle is defined there between that is denoted the contact angle $\phi_C$ of the drive belt 3, which contact angle essentially matches a V-angle defined between the two sheaves 4, 5 of each pulley 1, 2, which latter angle is denoted the pulley angle $\phi_P$.

The transverse segments 32 are able to move, i.e. to slide along the carrier rings 31 in the circumference direction L, so that a torque can be transmitted between the transmission pulleys 1, 2 by the transverse segments 32 pressing against one another and pushing each other forward along the carrier rings 31 in a direction of rotation of the drive belt 3 and the pulleys 1, 2. In the exemplary embodiment of this FIG. 2, the carrier rings 31 are composed of five individual endless bands each, which endless bands are mutually concentrically nested to form the carrier ring 31. In practice, the carrier rings 31 often comprise more than five endless bands, e.g. nine or twelve or possible even more.

The transverse segment 32 of the drive belt 3, which is also shown in a side elevation in FIG. 3, is provided with two cut-outs 33 located opposite one another, which cut-outs 33 each open towards a respective axial side of the transverse segment 32 and each accommodate (a small section of) a respective carrier ring 31. A first or base portion 34 of the transverse segment 32 thus extends radially inwards from the carrier rings 31, a second or middle portion 35 of the transverse segment 32 is situated in between the carrier rings 31 and a third or top portion 36 of the transverse segment 32 extends radially outwards from the carrier rings 31. The radially inner side of each cut-out 33 is delimited by a so-called saddle surface 42 of the base portion 34 of the transverse segment 32, which saddle surface 42 faces radially outwards, generally in the direction of the top portion 36 of the transverse segment 32, and contacts the inside of an carrier ring 31.

A first or rear surface 38 of the two main body surfaces 38, 39 of transverse segment 32 that face in mutually opposite circumference directions L, is essentially flat. The other or front main body surface 39 of the transverse segment 32 is provided with a so-called rocking edge 18 that forms, in the radial direction H, the transition between an upper part of the front surface 39, extending essentially in parallel with its rear surface 38, and a lower part thereof that is slanted such that it extends towards the rear surface 38. In FIG. 2 the rocking edge 18 is indicated only schematically by way of a single line, however, in practice the rocking edge 18 is mostly provided in the shape of a convexly curved transition surface. The said upper part of the transverse segment 32 is thus provided with an essentially constant dimension between the main body surfaces 38, 39, i.e. as seen in the circumference direction L, which dimension is typically referred to as the thickness of the transverse segment 32.

It is noted that in order to realise a favourable contact between the transverse segments 32 and the carrier rings 31, in particular to promote the preferred alignment of a respective carrier ring 31 relative to the (width of) respective saddle surfaces 42 of the transverse segments 32, these saddle surfaces 42 are typically curved at least slightly convexly and at least in the axial direction. In this respect, it is known that during operation of the drive belt 3 the carrier rings 31 tend to be centred on the highest point of the convexly curved saddle surfaces 42. The convexity of the saddle surfaces 42 that is applied in practice is, however, so small that it cannot be discerned on the scale of FIG. 2.

FIG. 4A provides a schematically drawn enlargement of a detail of the transverse segment 32, including the saddle surface 42 thereof. Even at the scale of FIG. 4A, the radius of curvature Rs of the saddle surface 42 has been exaggerated by about 5 times to be able to illustrate this design feature. To give a numeric example; in a practical design of the drive belt 3, the saddle surface 42 may extend for about 10 mm in the width direction W and is convexly curved at about 200 mm radius Rs. This means that a highest point HP of the saddle surface 42 lies about 62 microns above (i.e. radially outward from) a left side endpoint LE and/or a right side endpoint RE of the saddle surface 42. Still, it is known from practice that even this minimal convexity of the saddle surface 42 supports and benefits the operation, in particular the longevity of the drive belt 3.

It is noted that the left and right side endpoints LE, RE of the saddle surface 42 correspond to locations were a local radius of curvature of the contour of the transverse segment 32 changes sharply between the relatively large radius of curvature Rs of the saddle surface 42 to a much smaller radius of curvature that defines the transition between the saddle surface 42 and the middle portion 36 of the transverse segment 32 or between the saddle surface 42 and a respective contact face 37 of the transverse segment 32. Typically, such change of the local radius of curvature at the endpoints LE, RE of the saddle surface 42 is by two orders of magnitude, for example from the said 200 mm radius Rs to a value close to 1 mm. Thus, the saddle surface 42 of the transverse segment 32 is well-defined and the size and shape thereof, including the location of the said endpoints LE, RE thereof can be accurately determined with high certainty.

In FIG. 4A the arc-shaped contour of the saddle surface 42 is indicated by the solid line 42. The saddle surface 42 extends symmetrically between the respective left side and right side endpoints LE, RE thereof, such that a geometric midpoint MP i.e. the middle of the saddle surface 42, also represents the highest (radially outermost) point thereof. With such a symmetric contour thereof, the carrier ring 31 will thus be aligned with such midpoint MP of to the saddle surface 42 during operation of the drive belt 3. Alternatively, the saddle surface is shaped according to an asymmetric contour, as is also illustrated in FIG. 4A by means of the dashed line 42-A. A highest point HP2 of this latter saddle surface 42-A is offset towards the right side of the midpoint MP of the saddle surface 42-A and the (self-)alignment of the carrier ring 31 is biased towards such (right) side of the saddle surface 42-A.

According to the present disclosure such biasing of the (self-)alignment of the carrier ring 31 may also be realised in an alternative, potentially more favourable and/or effective manner that is illustrated in FIG. 4B. In FIG. 4B the dashed line 42 illustrates the known convexly curved, symmetric contour of the saddle surface 42, whereas the solid line 42-B illustrates the novel design of saddle surface 42-B in accordance with the present disclosure. A convex curvature of the novel saddle surface 42-B is different towards either (i.e. left and right) axial side thereof, as a result whereof the carrier ring 31 will be biased more towards the lesser curved axial side of the saddle surface 42-B, i.e. the side defined according to the larger radius of curvature. More specifically, in the exemplary embodiment of FIG. 4B, the radius of (convex) curvature Rsl of the left side of the saddle surface 42-B is smaller than the radius of (convex) curvature Rsr of the right side of the saddle surface 42-B and the (self-)alignment of the carrier ring 31 is thus biased towards the right side of the saddle surface 42-B.

In the above, first embodiment of the saddle surface 42-B of the novel transverse segment 32, the said left and right (axial) sides of the saddle surface 42-B are defined relative to the highest point HP1 thereof, which highest point HP1 coincides with the geometric midpoint MP of the saddle surface 42-B. However, in a second embodiment of the saddle surface 42-C of the novel transverse segment 32, which second embodiment is illustrated in FIG. 4C, such highest point HP2 point of the saddle surface 42-C is axially offset relative to the said midpoint MP in accordance with the known art. In this second embodiment, the biasing effect of the different radii of curvature Rsl, Rsr on the (self-)alignment of the carrier ring 31 is thus supported by the off-centre location of the highest point HP2 of the saddle surface 42-C.

In the above, first and second embodiments of the saddle surface 42-B, 42-C of the novel transverse segment 32, the left side of the saddle surface 42-B, 42-C with the strongest curvature, i.e. showing the smallest radius of curvature Rsl drops-off more in radially inward direction than the lesser curved, right axial side thereof. That is to say that the left side endpoint LE of the saddle surface 42-B, 42-C is located considerably below, i.e. radially inward of its right side endpoint RE. Even though such height difference between these end points LE and RE of the saddle surface 42 will typically be only minimal in absolute terms and, for example, amounts to 10 microns or so, it may still negatively affect the optimal functioning of the drive belt 3. In particular, a tensile stress in the carrier ring 31 may not be optimally distributed therein during operation, such that the fatigue strength of the carrier ring 31 may also be suboptimal. Therefore, in a third embodiment of the saddle surface 42-D of the novel transverse segment 32, which third embodiment is illustrated in FIG. 4D, the (left) side of the saddle surface 42-D that is most strongly curved, is provided with a variable radius of curvature Rsl' that decreases in a direction towards the respective axial side (i.e. end point LE) of the saddle surface 42-D. On average, the said variable radius of curvature Rsl' should still be smaller than the (average) radius Rsr of curvature of the other, lesser curved (right) side of the of the saddle surface 42-D. In this latter, third embodiment of the saddle surface 42-D, the tensile stress occurring in the carrier ring 31 during operation of the drive belt 3, is more favourably, in particular more equally distributed therein, at least in comparison with first and second embodiments of the saddle surface 42-B, 42-C.

The present disclosure, in addition to the entirety of the preceding description and all details of the accompanying figures, also concerns and includes all the features of the appended set of claims. Bracketed references in the claims do not limit the scope thereof, but are merely provided as non-binding examples of the respective features. The claimed features can be applied separately in a given product or a given process, as the case may be, but it is also possible to apply any combination of two or more of such features therein.

The invention(s) represented by the present disclosure is (are) not limited to the embodiments and/or the examples that are explicitly mentioned herein, but also encompasses amendments, modifications and practical applications thereof, in particular those that lie within reach of the person skilled in the relevant art.

The invention claimed is:

1. Transverse segment (32) for a drive belt (3) for a continuously variable transmission, which drive belt (3) comprises at least two carrier rings (31) and a number of these transverse elements (33) that are mutually arranged slideably on the carrier rings (31), in which transverse segment (32) at least two recesses (33) are provided for the accommodation of at least one of the carrier rings (31) each, which recesses (33) extend over the thickness of the transverse segment (32) between a front main body surface (39) and a rear main body surface (38) thereof and which recesses (33) are delimited in one direction, being a radially inward direction relative to the drive belt (3), by radially outward facing saddle surfaces (42) of the transverse segment (32) that support a radial inside of the carrier rings (31) and that are provided with a convex curvature in the axial direction of the drive belt (3) defining a most radially outwardly located highest point (HP2) on the saddle surfaces (42) that is located outside a geometric midpoint (MP) of the saddle surfaces (42), wherein the saddle surfaces (42) to the longer side thereof relative to the highest point (HP2) are more sharply curved than an opposite, shorter side thereof, at least on average.

2. The transverse segment according to claim 1, wherein a local radius of curvature (Rsl') of the longer, more sharply curved side of the saddle surfaces (42) decreases in a direction away from the highest point (HP2) thereof.

3. The transverse segment according to claim 1, wherein an average value of the radius of curvature (Rsl) of the longer, more sharply curved side of the saddle surfaces (42) is smaller than an average value of the radius of curvature (Rsr) of the opposite, shorter side thereof.

4. The transverse segment according to claim 2, wherein an average value of the radius of curvature (Rsl) of the longer, more sharply curved side of the saddle surfaces (42) is smaller than an average value of the radius of curvature (Rsr) of the opposite, shorter side thereof.

* * * * *